April 9, 1929.  F. J. KRÖDEL  1,708,475
PROPELLER MECHANISM
Filed Sept. 10, 1927  2 Sheets-Sheet 1

Inventor:
Frank J. Krödel
by Schmidt & Schmidt
Attys

April 9, 1929. F. J. KRÖDEL 1,708,475
PROPELLER MECHANISM
Filed Sept. 10, 1927 2 Sheets-Sheet 2
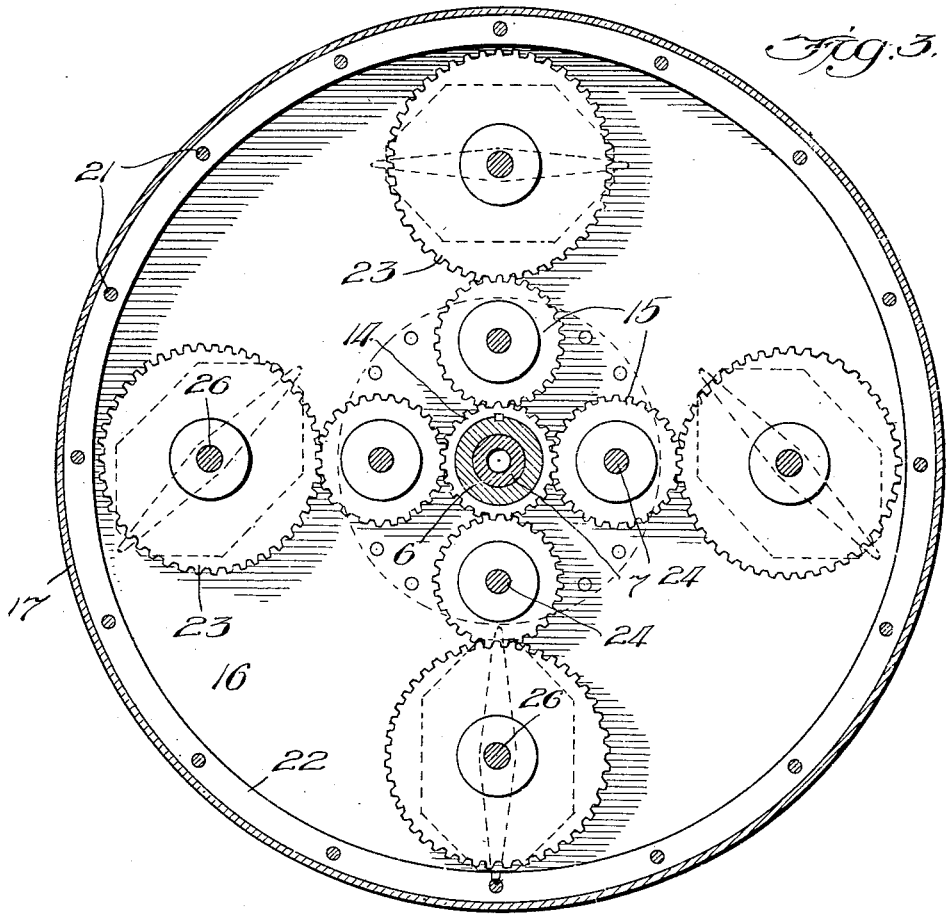
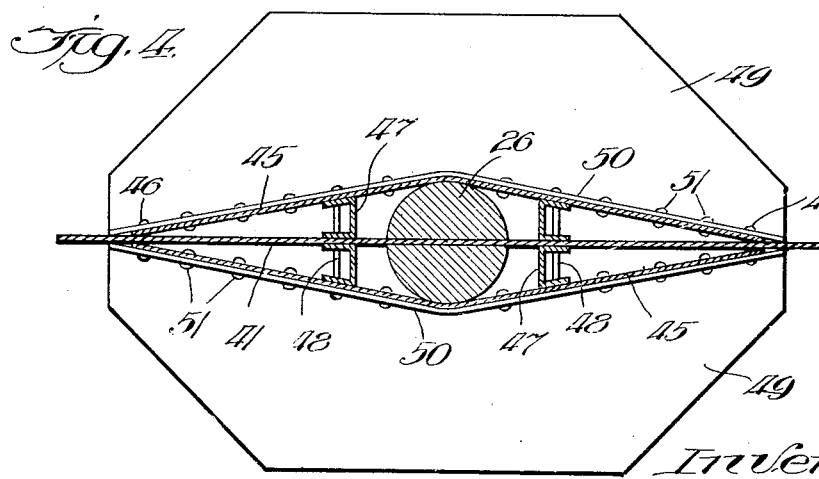
Inventor:
Frank J. Krödel Patented Apr. 9, 1929.

1,708,475

UNITED STATES PATENT OFFICE.

FRANK J. KRÖDEL, OF CHICAGO, ILLINOIS, ASSIGNOR OF ONE-SEVENTH TO JOHN T. DE REMER, ONE-SEVENTH TO JAMES F. GILDEA, ONE-SEVENTH TO D. A. McCARTHY, ONE-SEVENTH TO HENRY H. KRÖDEL, ONE-SEVENTH TO FRED F. KESSLER, AND ONE-SEVENTH TO CLAUDE M. ERCANBRACK, ALL OF CHICAGO, ILLINOIS.

PROPELLER MECHANISM.

Application filed September 10, 1927. Serial No. 218,766.

This invention relates to an improved operating mechanism for fluid propellers. More particularly it is concerned with the construction of the blades therefor, of the mountings wherein the blades are carried, and of the means employed for imparting motion to the blades. The present construction also combines the advantages of being inexpensive to manufacture and assemble, durable and dependable in service, and economical to operate.

A suggestive embodiment of my invention is set forth in the accompanying drawings wherein—

Fig. 3 is a transverse section, taken on line 3—3 of Fig. 1; and

Fig. 4 is an enlarged transverse section taken on line 4—4 of Fig. 1.

Figure 1:
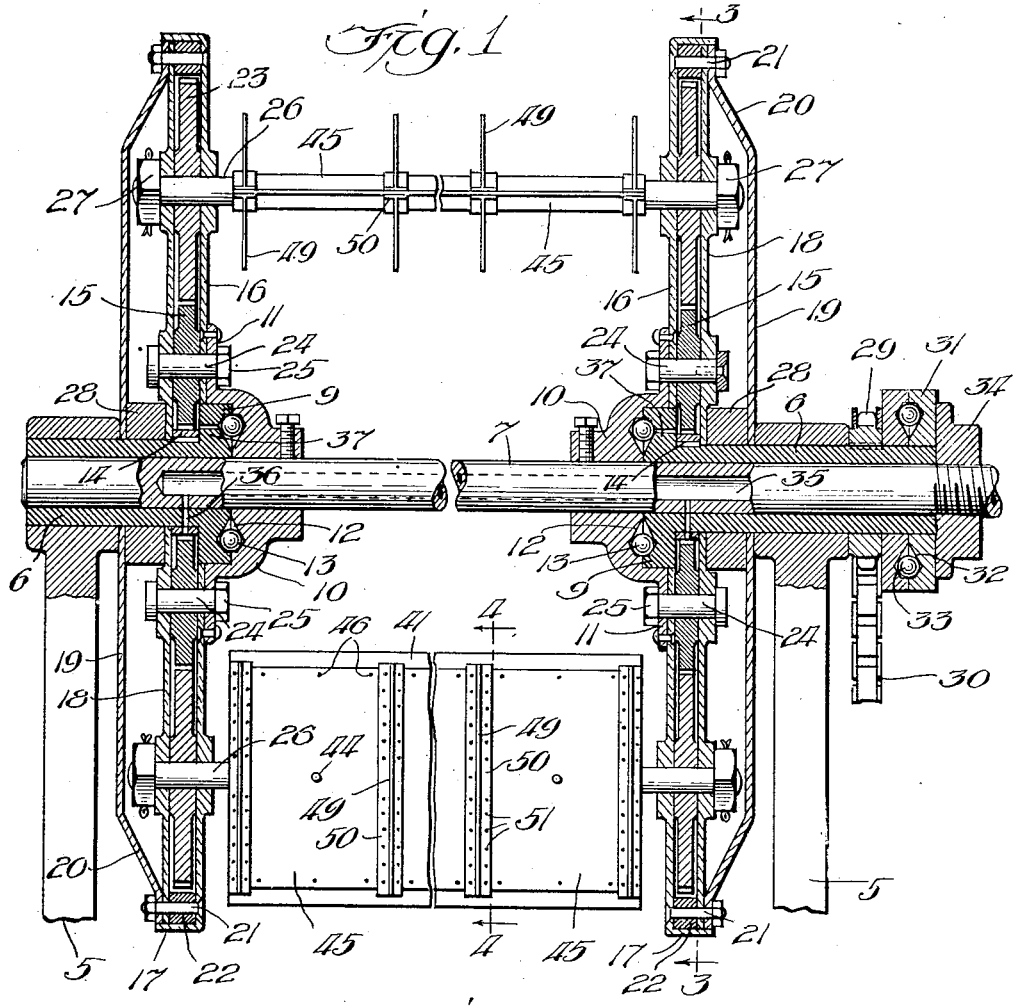
Figure 1 is a central longitudinal section through the propeller mechanism in its entirety.

The mechanism herein shown may comprise a pair of uprights 5 in the form of supports through the upper ends of which are extended sleeves 6 which constitute bearings for a main shaft 7. The parts associated with each sleeve are alike so that a description of but one need be given.

A flange 9 which is formed at the inner end of the sleeve abuts a hub 10 mounted fast upon the shaft, the hub being provided also with a radially extending flange 11. Between the sleeve flange and hub is an annular raceway 12, shown as pear-shaped in cross section, wherein may be accommodated balls 13 forming an anti-friction thrust bearing. Mounted fast on the sleeve adjacent its flange is a sun gear 14 in mesh with a plurality of idler gears 15, four being the suggested number. These idler gears are confined in place between a head plate 16 having a marginal flange 17 and a bearing plate 18 the periphery of which lies within and adjacent the flange of the head plate. A cap plate 19 which is inclined as at 20 near its edges is receivable also within the confines of the flange 17 so as to abut the bearing plate at this point. Elsewhere the cap plate 19 is spaced away from the bearing plate for the accommodation of certain parts which will be hereafter noted. The several plates constituting the head structure just described may be connected in unitary relation by bolts 21 which extend therethrough, a ring 22 being interposed between the head and bearing plates to ensure proper separation for the accommodation of the sun gear 14, the idler gears 15, and other planetary gears 23 in mesh with the latter.

Each idler gear may be freely mounted upon a headed pin 24 which extends through the bearing plate 18 and the head plate as well as the flange 11 of the hub 10. A nut 25 may be secured adjustably to the exposed end of this pin, which is screw-threaded for the purpose, and serves to lock the head assembly to the hub so as to cause rotation of the former when the latter is revolved in response to turning of the shaft 7. The planetary gears are each carried fast upon a shaft 26 which is journaled in the head and bearing plates, being provided at each end with a nut or collar 27 by which to prevent endwise displacement. The space between the cap and bearing plates is sufficient for the accommodation of the parts so carried by the ends of the shaft 26. The cap plate 19 is shown as fitting closely around the sleeve 6 between one end of the support 5 and a spacer block 28 which extends to the bearing plate 18. The construction thus provided is sufficiently reinforced to withstand all rigors of ordinary usage.

It is contemplated that a rotary force from a power source (not shown) will be applied to the shaft 7 for transmitting turning movements thereto. It is desirable that means be provided for a limited oscillation of the sleeve 6 whereby to shift the positions of the mountings for the idler gears, with a consequent advance or retardation in the positions of the planetary gears. For this purpose, I mount fast on the main shaft a sprocket wheel 29 adjacent the outer end of one support 5, and over this wheel run a chain 30 which connects with any suitable control (not shown). Adjacent the sprocket wheel is a split collar 31 having therein a pear-shaped raceway 32 for accommodating balls 33, this collar being locked in position by a nut 34 which is screw-threaded on the end of shaft 7. The means described, in conjunction with the ball raceway 12, heretofore noted, will resist effectively all end thrusts which are developed during operating of the present mechanism.

A bore 35 which extends longitudinally within the shaft 7 communicates with one or more oil holes 36 leading to the compartment between the main and bearing plates. In addition other oil holes 37 may extend from this compartment into the ball raceway 12 so as to feed lubricant thereto. The gear compartment which is thus assured of lubricant is preferably sealed adjacent the spacer ring 22, and elsewhere, if necessary, by suitable gaskets or otherwise so as to prevent escape of fluid therefrom.

Figure 2:
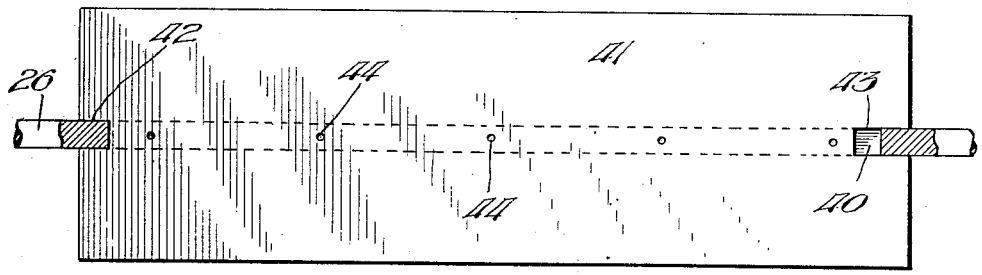
Fig. 2 is an enlarged detail in longitudinal section of one blade together with the mounting therefor.

The mechanism heretofore described is suited admirably for the operation of certain propeller blades having an improved construction, such as will now be described. One such blade is carried upon each shaft 26 so as to be revolved with movement of the planetary gears. As shown in Fig. 2, I provide through each of said shafts a longitudinal slot 40 in which may be inserted the backbone or main supporting plate 41 for the blade. This plate has slots 42 and 43 at opposite ends, the latter being the longer to permit the blade, when inserted through the shaft slot, to be shifted endwise to a final position, as shown. When so positioned, the blade is secured by one or more pins 44.

With the plate 41 so made fast to the shaft 26, I associate a pair of outer plates 45 occupying positions upon opposite sides thereof. These outer plates connect as at 46 directly with the supporting plate 41 adjacent the edges thereof, and diverge so as to extend around the shaft 26 upon opposite sides thereof. They present in effect a stream-like construction when so related to the main supporting plate 41 and the shaft 26 on which the blade is carried. Additional connections between the outer and supporting plates may be provided by channel braces 47 which are placed between the shaft 26 and the connections 46. Pins 48 may be passed through these channels and the associated plates whereby to provide a unitary construction. Each blade, furthermore, carries on its outer plates a plurality of vanes, preferably of two-part construction, comprising a pair of walls 49 arranged in adjacent relation and a base flange 50 which, by pins or rivets 51, is secured to the outer plates 45. The vanes so formed extend transversely and outwardly from the plates of the blade on which they are carried, as best indicated in Fig. 1.

From the preceding description, it will be apparent that I have provided a planetary transmission for the operation of the several blades of the present propeller. The angular positions of these propellers may be changed at any time, whether the mechanism be stationary or in motion, by simply oscillating the sprocket wheel 29 to the desired extent. More important, however, is the provision herein made for the complete housing of the planetary gearing, and the effective lubrication thereof, such as is necessary for a successful and prolonged operation. The blades are, furthermore, constructed in such a manner as to possess a maximum of strength with a minimum of weight, and this is of particular advantage when the apparatus is employed on aeroplanes, airships, helicopters, etc.

I claim:

1. A propeller mechanism in which is comprised a head having spaced plates in unitary relation, a train of gearing between the plates of the head, a shaft with which the head is connected for rotation, means for setting the gear train in motion, a third plate associated with the head in spaced relation, and means for holding the several head plates apart a fixed distance, substantially as described.

2. A propeller mechanism in which is comprised a slotted shaft mounted to travel through a circular orbit, and a blade carried by the shaft comprising a central supporting plate inserted through the shaft slot, a pair of outer plates disposed on opposite sides of the shaft and converging toward each other adjacent opposite edges of the main plate, means securing the three plates in unitary relation, and vanes extending laterally from the outer plates, substantially as described.

3. A propeller mechanism in which is comprised a revolvable shaft mounted to travel in a circular orbit, and a blade carried fast by said shaft comprising a pair of plates extended along opposite sides thereof, and converging toward their opposite edges, means for securing the plates to each other and to the shaft, and vanes carried by said plates, substantially as described.

4. A propeller mechanism in which is comprised a revolvable shaft formed with a longitudinal slot therethrough, and a blade carried fast by the shaft comprising a main supporting plate having at opposite ends thereof slots of unequal depth, the plate being receivable through the shaft slot the length whereof is slightly less than the plate permitting the latter, when shifted endwise in one direction, to interlock therewith, and vanes extending transversely on opposite sides of said plate and having means for connecting therewith, substantially as described.

FRANK J. KRÖDEL.